United States Patent
Risager et al.

(10) Patent No.: US 8,096,762 B2
(45) Date of Patent: Jan. 17, 2012

(54) WIND TURBINE WITH PITCH CONTROL ARRANGED TO REDUCE LIFE SHORTENING LOADS ON COMPONENTS THEREOF

(75) Inventors: Lars Risager, Ry (DK); Rasmus Svendsen, Randers (DK); Erik Carl Miranda, Randers (DK)

(73) Assignee: Vestas Wind Systems A/S, Aarhus N (DK)

( * ) Notice: Subject to any disclaimer, the term of this patent is extended or adjusted under 35 U.S.C. 154(b) by 47 days.

(21) Appl. No.: 12/570,846

(22) Filed: Sep. 30, 2009

(65) Prior Publication Data

US 2010/0014971 A1  Jan. 21, 2010

Related U.S. Application Data

(63) Continuation of application No. PCT/DK2008/000122, filed on Mar. 28, 2008.

(30) Foreign Application Priority Data

Mar. 30, 2007 (DK) ................................ 2007 00504

(51) Int. Cl.
*F03D 7/04* (2006.01)
(52) U.S. Cl. ............................................. 416/1; 416/37
(58) Field of Classification Search .................. 416/36, 416/37, 1
See application file for complete search history.

(56) References Cited

U.S. PATENT DOCUMENTS

| | | | |
|---|---|---|---|
| 4,161,658 A | 7/1979 | Patrick | |
| 4,297,076 A * | 10/1981 | Donham et al. ............... | 416/37 |
| 4,348,155 A | 9/1982 | Barnes et al. | |
| 4,584,486 A | 4/1986 | Quynn | |
| 5,584,655 A | 12/1996 | Deering | |
| 5,660,527 A | 8/1997 | Deering et al. | |
| 6,888,262 B2 | 5/2005 | Blakemore | |
| 7,071,578 B1 | 7/2006 | Shibata et al. | |
| 7,086,834 B2 * | 8/2006 | LeMieux ........................ | 416/1 |
| 7,153,090 B2 | 12/2006 | DeLeonardo et al. | |
| 7,342,323 B2 | 3/2008 | Avagliano et al. | |

(Continued)

FOREIGN PATENT DOCUMENTS

EP 0995904 A2 4/2000

(Continued)

OTHER PUBLICATIONS

Torben Juul Larsen, Helge A. Madsen, Kenneth Thomsen: "Active load reduction using individual pitch, based on local blade flow measurements" Wind Energy, vol. 8, No. 1, Dec. 16, 2004, pp. 67-80, XP002504578.

(Continued)

*Primary Examiner* — Edward Look
*Assistant Examiner* — Aaron R Eastman
(74) *Attorney, Agent, or Firm* — Wood, Herron & Evans, L.L.P.

(57) ABSTRACT

A wind turbine is presented where the operation lifetime of the main bearing is extended by relieving the main bearing by reducing the mean bending moment on the bearing by means of individual pitch control of the blades of the rotor so as to create an aerodynamic mean tilt moment on the rotor by means of aerodynamic forces on the blades, the tilt moment at least partly counteracting the bending moment caused by the overhang load forces on the main bearing from the gravitational pull on the rotor mass.

17 Claims, 9 Drawing Sheets

U.S. PATENT DOCUMENTS

| | | | |
|---|---|---|---|
| 7,436,083 B2 | 10/2008 | Shibata et al. | |
| 7,436,085 B2 | 10/2008 | Shibata et al. | |
| 7,445,431 B2 | 11/2008 | Larsen et al. | |
| 7,452,185 B2 * | 11/2008 | Ide et al. | 416/35 |
| 7,476,985 B2 | 1/2009 | Llorente | |
| 7,891,944 B2 * | 2/2011 | Jeppesen et al. | 416/1 |
| 2004/0151584 A1 * | 8/2004 | Blakemore | 416/9 |
| 2004/0201220 A1 | 10/2004 | Andersen et al. | |
| 2005/0276696 A1 * | 12/2005 | LeMieux | 416/61 |
| 2006/0001268 A1 | 1/2006 | Moroz | |
| 2006/0002791 A1 | 1/2006 | Moroz | |
| 2006/0002792 A1 * | 1/2006 | Moroz et al. | 416/1 |
| 2006/0002797 A1 * | 1/2006 | Moroz et al. | 416/98 |
| 2006/0133937 A1 | 6/2006 | DeLeonardo et al. | |
| 2006/0140760 A1 | 6/2006 | Saddoughi et al. | |
| 2006/0140761 A1 | 6/2006 | LeMieux | |
| 2006/0145483 A1 | 7/2006 | Larsen et al. | |
| 2007/0025859 A1 | 2/2007 | Jacobsen | |
| 2007/0075546 A1 * | 4/2007 | Avagliano et al. | 290/44 |
| 2007/0164567 A1 | 7/2007 | Luetze | |
| 2007/0212209 A1 | 9/2007 | Borgen | |
| 2007/0294049 A1 * | 12/2007 | Pierce et al. | 702/151 |
| 2008/0084068 A1 | 4/2008 | Shibata et al. | |
| 2008/0136188 A1 | 6/2008 | Krueger | |
| 2008/0260514 A1 | 10/2008 | Nielsen et al. | |
| 2009/0039651 A1 | 2/2009 | Stiesdal | |
| 2009/0068018 A1 | 3/2009 | Corten | |
| 2009/0074574 A1 | 3/2009 | Godsk et al. | |
| 2010/0004878 A1 * | 1/2010 | Volanthen et al. | 702/42 |

FOREIGN PATENT DOCUMENTS

| | | |
|---|---|---|
| EP | 1674724 A2 | 6/2006 |
| EP | 1770278 A2 | 4/2007 |
| EP | 1870596 A2 | 12/2007 |
| GB | 2117933 A | 10/1983 |
| GB | 2117934 A | 10/1983 |
| WO | 2004074681 A1 | 9/2004 |
| WO | 2007104306 A1 | 9/2007 |

OTHER PUBLICATIONS

Danish Search Report; PA 2007 00504; Nov. 5, 2007; 1 page.

E. A. Bossanyi: "Further load reductions with individual pitch control" Wind Energy, vol. 8, No. 4, Jul. 7, 2005, pp. 481-485, XP002504579.

E. A. Bossanyi "Individual Blade Pitch Control for Load Reduction", Wind Energy 2003, vol. 6, 11 pages.

International Preliminary Report on Patentability; PCT/DK2008/000122; Jul. 8, 2009; 13 pages.

International Search Report; PCT/DK2008/000122; Nov. 19, 2008; 3 pages.

Caselitz et al, "Reduction of fatigue loads on wind energy converters by advanced control methods", European Wind Energy Conference, Oct. 1997, 4 pages.

* cited by examiner

WIND TURBINE WITH PITCH CONTROL ARRANGED TO REDUCE LIFE SHORTENING LOADS ON COMPONENTS THEREOF

CROSS-REFERENCE TO RELATED APPLICATIONS

The present application is a continuation of pending International patent application PCT/DK2008/000122 filed on Mar. 28, 2008 which designates the United States and claims priority from Danish patent application PA 2007 00504 filed on Mar. 30, 2007, the content of which is incorporated herein by reference.

FIELD OF THE INVENTION

The present invention relates to a wind turbine with pitch control, which is arranged to reduce life-shortening loads on components of the wind turbine.

BACKGROUND OF THE INVENTION

The power output from a modern wind turbine can be controlled by means of a control system for regulating the pitch angle of the rotor blades. The rotor rotation speed and power output of the wind turbine can hereby be initially controlled e.g. before a transfer to a utility grid through power converting means. An advantage of this control is a protection of the rotor from rotating at an excessive speed at high wind speeds and save the rotor blades from excessive loads.

Especially for large rotor diameters, the distribution of the wind inflow profile can be non-uniform over the area of the rotor, resulting in a non-uniform load to each rotor blade as a function of one full rotation, as well as asymmetrical out of plane loadings for the drive train of the wind turbine. The asymmetrical load from the wind on the rotor plane results in the rotor being loaded with a varying tilt moment and a yaw moment. For a free wind inflow situation the wind shear distribution is approximately linear and the said load as a function of rotation is of nearly sinusoidal behavior with a frequency equal to the rotor rotation frequency. In order to keep a more constant load on the rotor blades, pitch control functions have been applied to wind turbine pitch controllers, where a rotor-cyclic correction with a frequency equal to the rotor rotation has been added to the overall pitch angle setting of the individual rotor blades.

Any obstacles within certain up wind distance of a wind turbine create a wake for the wind turbine and consequently eliminate the free wind inflow situation. An example of an obstacle may be other wind turbines, as a wind turbine always cast a wake in the downwind direction.

It is known in the technical area of wind turbines to provide means for pitch control means for the blades of the rotor, i.e. means for rotating each of the blades about the longitudinal axis to a predetermined angular position to obtain a pitch angle of the blade which may differ from the pitch angle of the other blade or blades of the wind turbine rotor, with the purpose of reducing the extreme loads as well as the load variations causing fatigue on the blades, in particular at the root of the blades, and on other parts of the rotor and transmission. The pitch control may be independent for each blade so that no dependency exists between the pitch angles of the individual blades, or the pitch control may be of the cyclic type, i.e. that the instantaneous pitch angle of a rotor blade depends on a function of the instantaneous azimuth angle of the rotor blade with the function being at least substantially the same for all blades of the rotor, whereby all blades go through substantially the same pitch angle sequence during a full rotation depending on the azimuth angle of the individual blade.

Caselitz et al, "Reduction of fatigue loads on wind energy converters by advanced control methods", European Wind Energy Conference, October 1997, Dublin Castle, Ireland, discloses a method reducing the fatigue loads by analysing the asymmetrical load on the rotor to determine the aerodynamically induced tilt and yaw moments and compensate these by pitch of the rotor blades in order to reduce the varying loads on the blades and other parts of the wind turbine, in particular the flapwise bending moment variations, i.e. the moment bending the blades out from the plane of the rotor disc, on the blades causing fatigue.

E. A. Bossanyi "Individual Blade Pitch Control for Load Reduction", Wind Energy 2003, Vol. 6, discusses the use of individual blade pitch control to reduce asymmetric aerodynamic loads due to wind speed variations across the rotor disc due to wind shear, tower shadow, yaw misalignment and turbulence. The blade load variations with a period of one revolution of a blade are analysed and the pitch of the individual blade is adjusted to compensate for the asymmetric loads, thus reducing the fatigue inducing load variations.

In EP 0 995 904 a wind turbine is disclosed having blades with adjustable angles of attack and a transducer which provides a measurement parameter giving a measure of the current load on an element of the wind turbine structure. The blade angle is adjusted depending on the measurement parameter, which represents an acceleration or deformation of the structural element and gives a measure of a force or torque. The rotor blades are individually adjustable and the adjustment is made in order to reduce impact forces on the wind turbine bearing and to reduce the variations in the loads so as to eliminate fatigue of the wind turbine elements. In WO 2004/074681 a similar method for controlling the aerodynamic load of a wind turbine is disclosed.

The size of wind turbine rotors and thereby the production from the wind turbines is steadily increasing, which also as a side effect induces increasing load on all parts of the wind turbine, in particular the drive train including blades, generator, bearings, a possible gear box etc. often resulting in a short lifetime for the involved components unless action is taken to reduce the loads that cause the shortening of the lifetime. The aerodynamic loads on the wind turbine parts may at least to some extent be controlled by a pitch control, and it is an object of the present invention to provide an improved control of the loads on the wind turbine part reducing their lifetime by means of operating the pitch control.

SUMMARY OF THE INVENTION

It has been realised with the present invention that the operation lifetime of the main bearing of a wind turbine may be extended by relieving the main bearing, i.e. the bearing supporting the rotor of the wind turbine rotational with respect to the nacelle, by reducing the mean bending moment on the bearing by means of individual pitch control of the blades of the rotor so as to create a mean tilt moment on the rotor by means of aerodynamic forces on the blades, the tilt moment at least partly counteracting the bending moment caused by the overhang load forces on the main bearing from the weight of the rotor.

Thus, the present invention relates to a wind turbine comprising
  a rotor having a hub and at least two blades,
  main bearing means providing a rotational support of the rotor on a non-rotating part of the wind turbine,
  blade pitching means for individual adjustment of the angle of each of the blades about their longitudinal axes, control means for controlling the operation of the blade pitching means, wherein the control means are arranged to operate the blade pitching means during ordinary operation of the wind turbine to perform adjustment of the angle of each of the blades so that the aerodynamic mean tilt moment on the rotor counteracts the bending moment on the main bearings caused by the overhang load forces from the gravitational pull on the rotor mass.

The bending moment caused by the overhang load forces are taken as measured when the rotor is idling or at stand still during low wind speed.

The mean tilt moment on the rotor due to the aerodynamic forces on the blades of the rotor are during the ordinary operation of the wind turbine preferably of a magnitude that counteracts at least 20% of the bending moment on the main bearings caused by the overhang load forces from the gravitational pull on the rotor mass, more preferred at least 30% and most preferred at least 50% thereof.

By the term ordinary operation of the wind turbine is understood at least operation at wind speeds where the wind turbine produces its rated power output, normally from a wind speed in the range of 10-15 m/s and until the cut-out wind speed, where the operation of the wind turbine is halted for safety reasons, typically around 25 m/s. It is preferred that the at least the range of average wind speeds between 12 m/s and 18 m/s are included. However, in a preferred embodiment of the invention, the counteracting tilt moment is provided at cut-in wind speeds, typically around 4 m/s or at only slightly higher wind speeds, such as from 8 m/s.

The control means are arranged to perform an adjustment of the pitch angle of the individual blade and preferably also a general adjustment of the pitch angle of the blades in order to adjust the power production of the wind turbine as well. The pitch angle of the individual blade may be adjusted to increase the power production of the wind turbine at operational conditions of low wind speeds, to decrease fatigue loads etc. in combination with the provision of the counteracting mean tilt moment.

The individual adjustment of the pitch angle of the blades is preferably of the cyclic type, where the pitch angle of the individual blade depends on a determined function of the instantaneous azimuth angle of that blade with the determined function being at least substantial the same for all blades of the rotor. However, the present invention may also be applied to wind turbines where the pitch control is independent for each blade so that no dependency between the pitch angles of the individual blades.

The wind turbine may preferably further comprise measurement means arranged to detect load data of the rotor, the load data being a measure of an instantaneous mechanical load on the rotor, and provide an output accordingly of said load data to the control means, wherein the control means further are arranged to operate the blade pitching means to perform adjustment of the angle of each of the blades in response to the load data output from the measurement means. The load data may be applied to control the pitch angle of the blades in order to maximise the power output from the wind turbine, to minimise the load variations and thereby the fatigue loads on parts of the wind turbine, in particular of the blades, in order to counteract oscillations of parts of the wind turbine or a combination of the above-mentioned.

According to one embodiment, the measurement means are arranged to provide a measure of the blade root bending moments, in particular for at least one blade of the rotor, and preferably on more than one blade e.g. two or three blades of the wind turbine. It is also preferred that the root bending moments are measured in two substantially perpendicular directions.

Alternatively or additionally to the measurement of blade root bending moments, e.g. by means of strain gauges, the wind turbine may include measurement means arranged to provide a measure of the angle of attack for the blades, such as openings in the blade surfaces for measurement of the static pressure at various positions along the aerodynamic profile of a cross section of the blade in order to determine the position of the highest static pressure and thereby the angle of attack at that particular cross section. The openings may be provided at one or more cross sections of the blade or blades. By knowing the experienced angle of attack and the rotational speed of the blade, the local wind speed may be deduced and thereby the loads on the blade at that particular position may be calculated.

As a further alternative, that may be combined with the aforementioned, the measurement means may be arranged to provide a measure of the load forces on a wind turbine main shaft, such as a low or high speed shaft, preferably measured in two substantially perpendicular directions.

The control means may furthermore comprise data collection and storage means for repeatedly collecting and storing said load data of the rotor, and data processing means for processing said collected load data of the rotor of the wind turbine and determine a load distribution function for the rotor from said load data, wherein the control means are arranged to operate the blade pitching means in response to the determined load distribution function.

The present invention further relates to a method of reducing the mean bending moment on the main bearing of a wind turbine, the rotor being rotationally supported by said main bearing, the method comprising the steps of operating blade pitching means of the wind turbine to individual pitching of the rotor blades of the wind turbine in response to a predetermined value of a counteracting aerodynamic mean tilt moment ($M_{t,c}$), so that the aerodynamic mean tilt moment on the rotor counteracts the bending moment on the main bearings caused by the overhang load forces from the gravitational pull on the rotor mass substantially corresponding with said predetermined value.

BRIEF DESCRIPTION OF THE DRAWINGS

The invention will be described in the following with reference to the figures in which.

The appended figures are provided for illustrating an embodiment of the present invention and are not intended to limit the scope of protection as defined by the claims.

DETAILED DESCRIPTION OF THE INVENTION

In the following is disclosed an example of implementation of the present invention for reducing the mean bending moment on the main bearing of a wind turbine having a pitch control arrangement of the cyclic pitch-type which uses a higher-order simulation of the blade loads to reduce fatigue of the blades.

Figure 1:
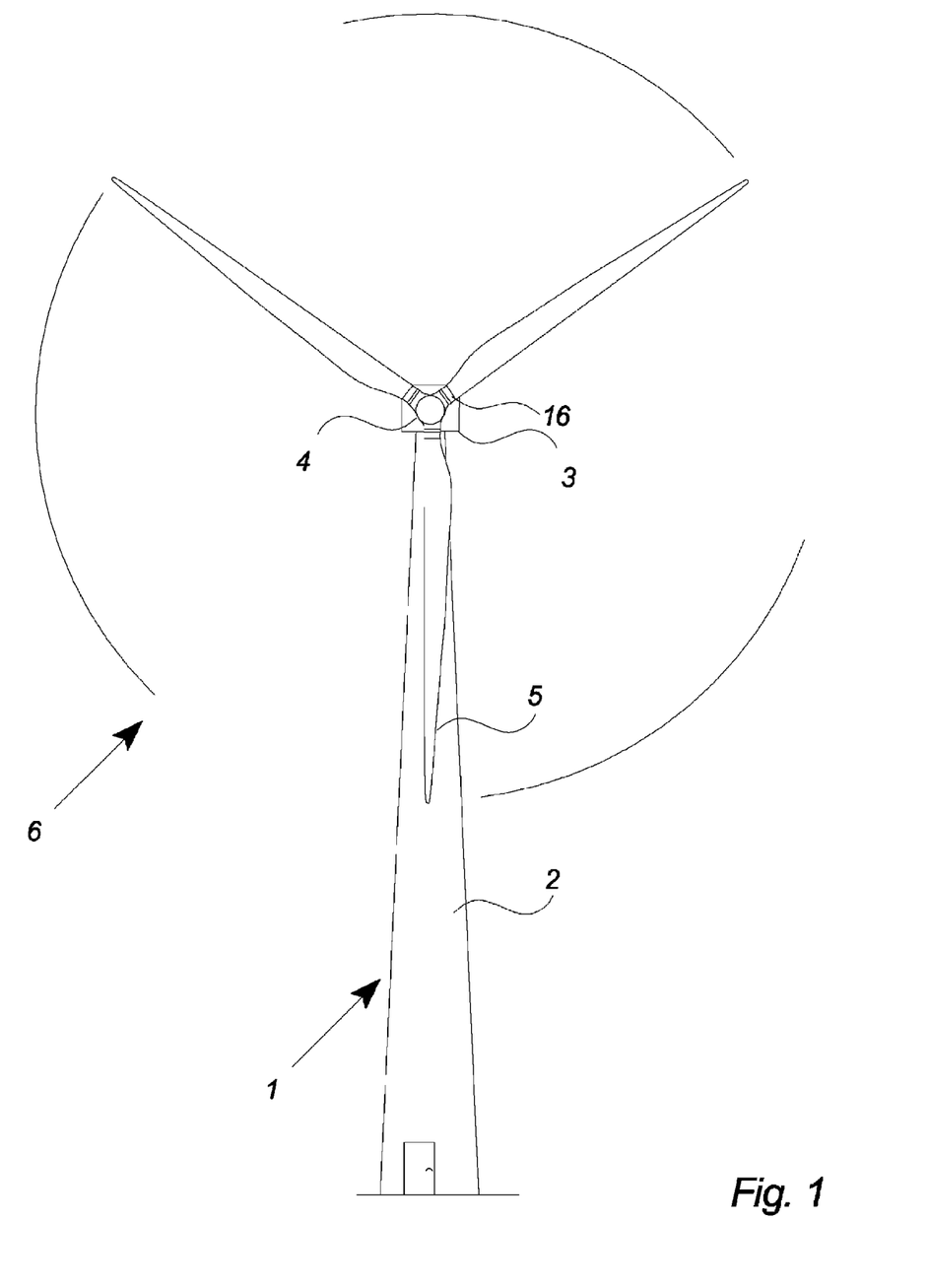
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 16. Each pitch mechanism includes a blade bearing and pitch actuating means which allows the blade to pitch in relation to the wind. The pitching of the blades is controlled for each blade of the rotor by a pitch controller operating with a higher-order cyclic pitch control as will be further explained below.

The blades 5 of the wind turbine rotor are connected to the nacelle through the low speed shaft 4' which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

Figure 2:
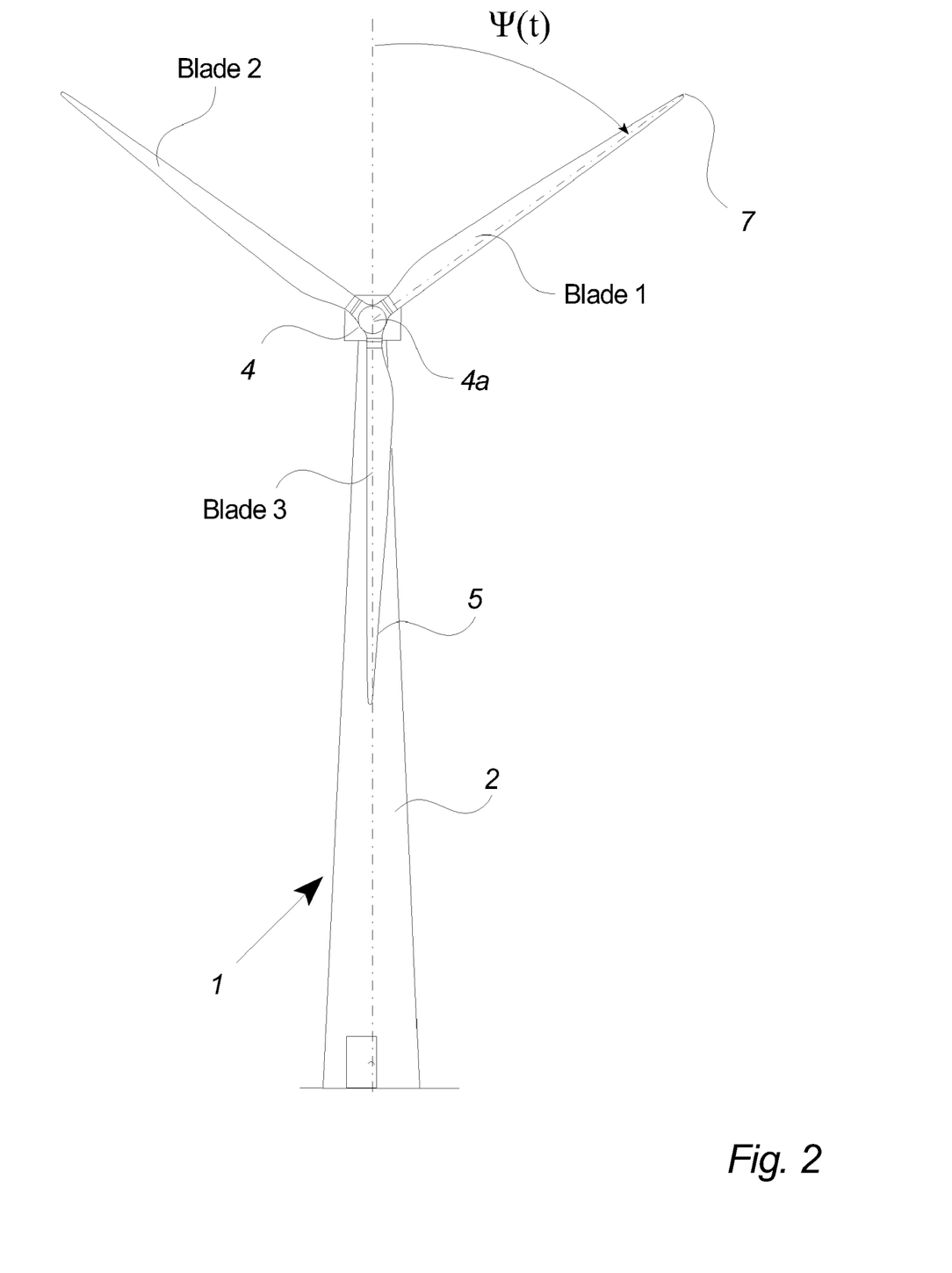
FIG. 2 illustrates a reference system for measuring the azimuth angle $\psi$. The azimuth $\psi$ is defined by the position of blade 1.

FIG. 2 illustrates how the azimuth angle ψ is measured as the angle between a virtual vertical line thru the centre of the low speed shaft 4' and a virtual line defined by the two endpoints: a—the centre of the low speed shaft 4a, and b—the tip point of the rotor blade 7. The azimuth angle is measured for one reference rotor blade e.g. blade 1 as a function of time and position.

Figure 3A:
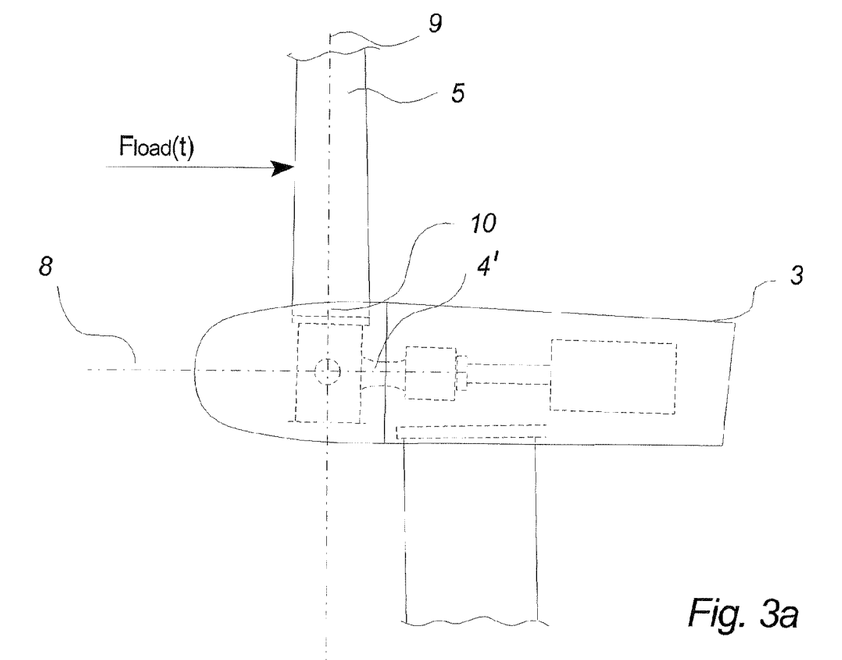
FIG. 3a illustrates schematically an example for direction of wind turbine rotor blade load measurements.

FIG. 3a illustrates one rotor blade 5 of a wind turbine connected to the nacelle 3 through the low speed shaft 4' which extends out of the nacelle front.

The rotor blade is loaded by a wind force $F_{load}(t)$ dependent of e.g. the wind direction relative to the rotor blade, the area of the rotor blade, the pitch of the rotor blade etc. The said wind force which literally tries to break off the nacelle from the tower or the foundation produces a load bending moment $m_x$ in the low speed shaft 4' and in the root of rotor blade 10 around its centerline 8.

Figure 3B:
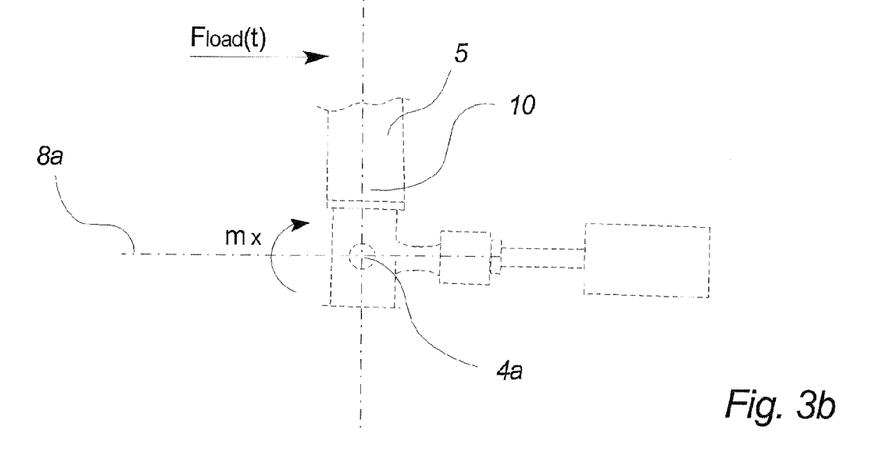
FIG. 3b illustrates a coordinate reference system for measuring the wind turbine rotor blade loads.

FIG. 3b illustrates a formalized diagram of the in situ forces acting on one rotor blade and illustrates the center point of the low speed shaft 4a, the horizontal centerline of the low speed shaft 8a, the vertical centerline of the rotor blade through the center point of the low speed shaft 4', a summarized wind force $F_{load}(t)$ and the direction of the load bending moment (or out of plane moment) $m_x$ of blade number x.

Figure 4:
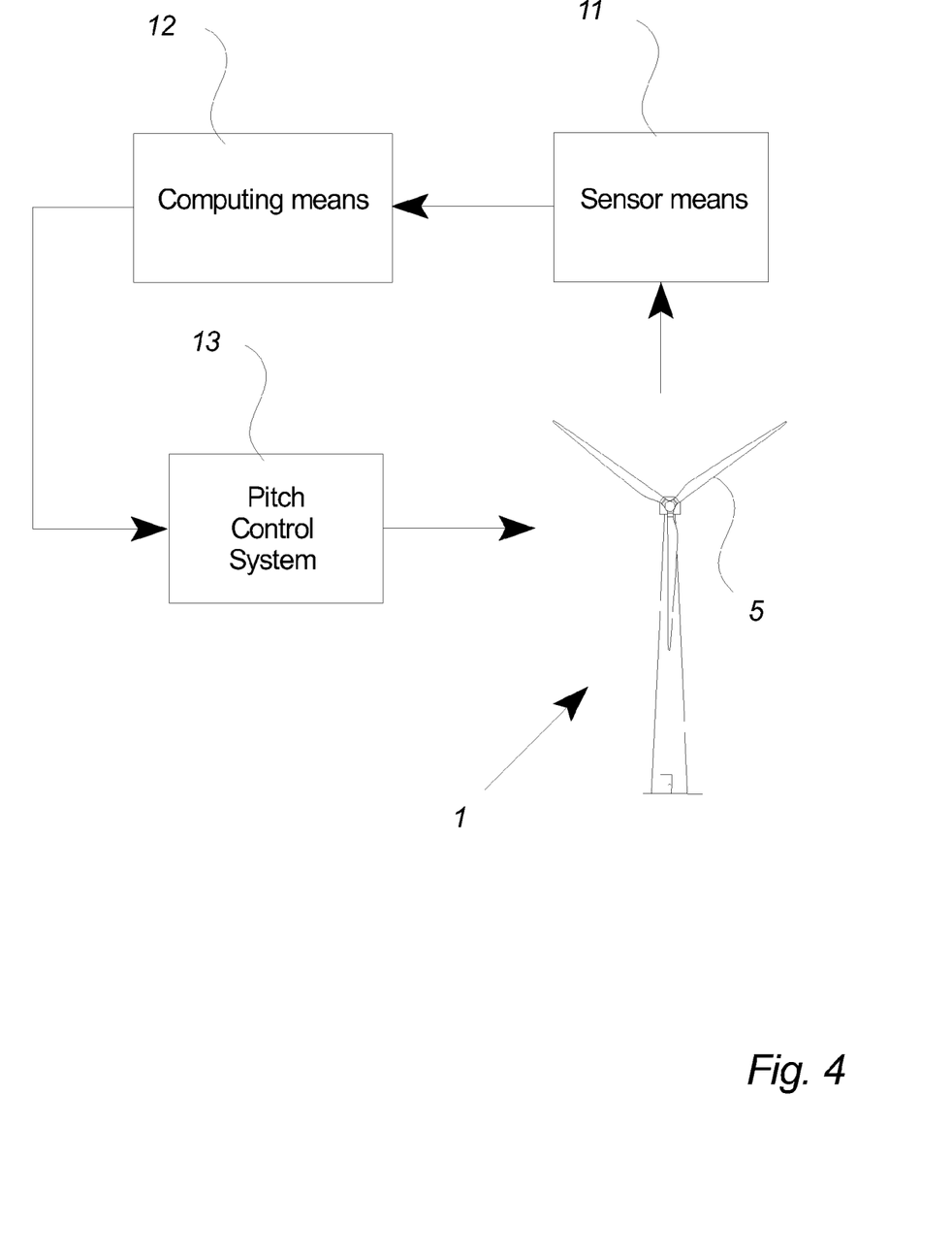
FIG. 4 illustrates schematically an embodiment of a control system for controlling the pitch angles of the wind turbine blades.

FIG. 4 illustrates schematically a preferred embodiment of a control system for controlling the pitch angles of the wind turbine blades Data of the wind turbine 1 are measured with sensor means 11 such as pitch position sensors, blade load sensors, azimuth sensors etc. The measured sensor data are supplied to computing means 12 in order to convert the data to a feedback signal. The feedback signal is used in the pitch control system 13 for controlling the pitch angle by establishing control values for controlling said at least one wind turbine blade 5.

The computing means 12 preferably includes a microprocessor and computer storage means for continuous control of the said feedback signal.

By continuously measuring the present load moments values on the rotor-blades, calculating a desired optimal pitch angle setting function for the blades dependent on the instantaneous azimuth angle position of the blade so as to decrease the fatigue loads on the blades and feeding this information to the pitch control system in a closed feedback loop it is possible to optimize the control values to (substantially) control the rotor at the design limits of the wind turbine and especially the design limits of the wind turbine blades. By combining this cyclic pitch-type feedback loop for reducing the varying fatigue loads on the wind turbine and in particular on the blades with a separate control loop for controlling the pitch angle of the blades to produce an aerodynamic mean tilt moment of the rotor for counteracting the bending moment on the rotor bearings according to the present invention, a control system is obtained which balances a reduction of the fatigue loads and of the life shortening mean bearing moment on the rotor bearings to increase the overall life time of the wind turbine components.

An example of prior art for controlling out of plane moment loads on wind turbine blades of a wind turbine is here described.

The blade root loads $M_R=[m_1\ m_2\ m_3]^T$ on the rotor blades of a 3 bladed wind turbine are defined as a result of a given linear wind shear distribution between a rotor blade top position (ψ=0) and down-ward position (ψ=π) corresponding closely to an idealized free wind inflow situation.

Figure 5A:
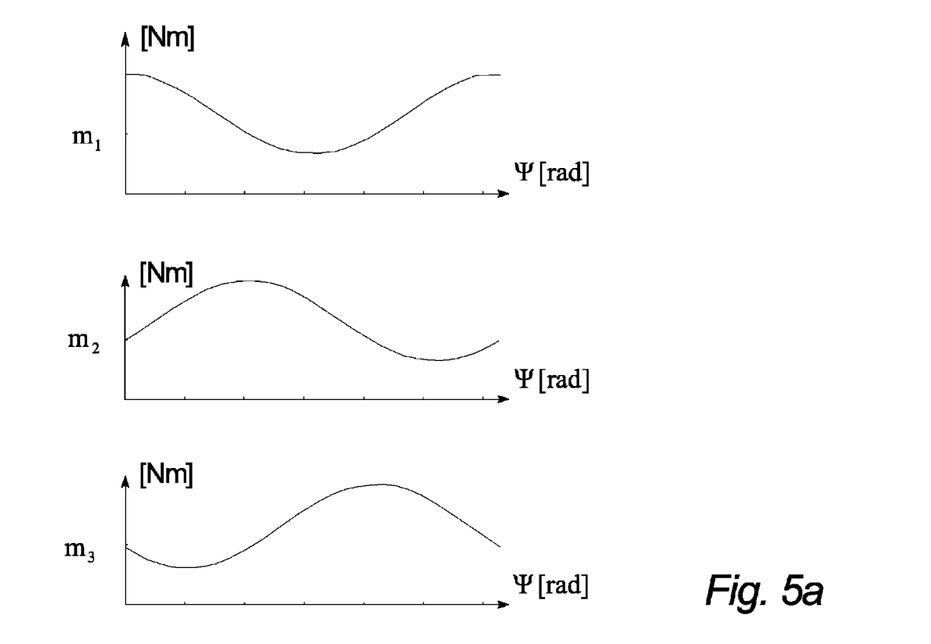
FIG. 5a illustrates the out of plane moment loads on the rotor blades of a 3 bladed wind turbine as a result of an idealized linear wind shear distribution between a rotor blade top position ($\psi=0$ [rad]) and down-ward position ($\psi=\pi$[rad]) corresponding to a free wind inflow situation.

FIG. 5a illustrates a typical picture of said moments for free inflow conditions.

Transforming $M_R$ into a coordinate system defined by the tilt, yaw and thrust equivalent directions, the respective moments loads $m_{tilt}$, $m_{yaw}$, $m_{sum}$ become:

$$m_{tilt} = m_1 \cdot \cos(\Psi) + m_2 \cdot \cos\left(\Psi + \frac{4}{3}\pi\right) + m_3 \cdot \cos\left(\Psi + \frac{2}{3}\pi\right)$$

$$m_{yaw} = -m_1 \cdot \sin(\Psi) - m_2 \cdot \sin\left(\Psi + \frac{4}{3}\pi\right) - m_3 \cdot \sin\left(\Psi + \frac{2}{3}\pi\right)$$

$$m_{sum} = m_1 + m_2 + m_3$$

Figure 5B:
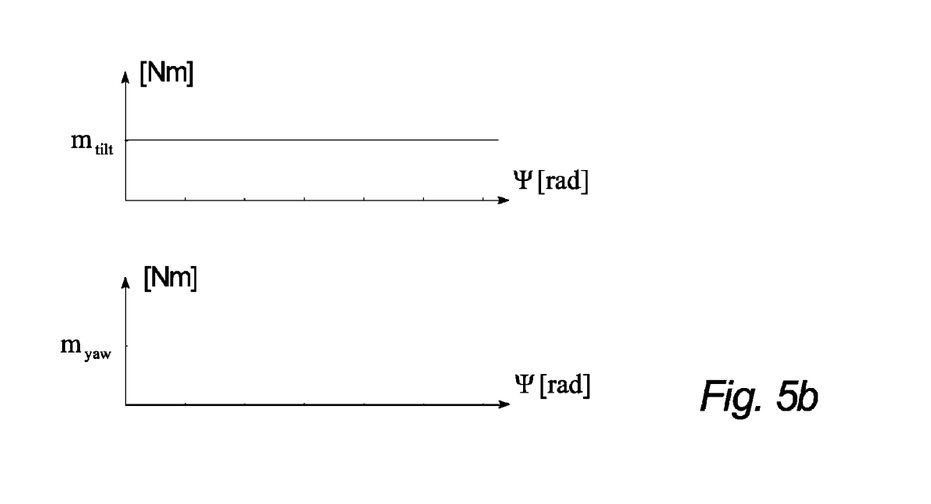
FIG. 5b illustrates the transformed moment loads, $m_{tilt}$, $m_{yaw}$, as a function of azimuth for one full rotor rotation and as a result of the said linear wind shear distribution with common pitch regulation of the rotor blades.

For the loads illustrated in FIG. 5a, the said transformed moment loads, $m_{tilt}$, $m_{yaw}$, are illustrated in FIG. 5b as a function of one full rotation of the rotor with common pitch regulation, i.e. that the pitch angle is the same for each blade of the rotor. For this idealized example of a prior art, $m_{tilt}$, $m_{yaw}$ are constant.

The close to sinusoidal behavior of $M_R$ as illustrated in FIG. 5a will result in fatigue loads on the rotor blades. A technique to partly compensate for these altering loads on the rotor blades can therefore be to individually control the rotor blades during a full rotation of a blade in order to level the distribution of wind forces i.e. a rotor blade is pitched less into the wind at the top than at the bottom of the rotating movement performed by the rotor including the blades.

Due to this close relation between $M_R$ and the desired controlling of the pitch angle, the desired pitch control signal is also a function of the azimuth angle i.e. a sinusoidal function on a frequency equal to the rotor-rotation frequency. This technique is called first order cyclic or rotor-cyclic pitch of the wind turbine blades i.e. a cyclic change of the pitch angle during a full rotation of a blade and depending on a sinusoidal function on a frequency equal to the rotor-rotation frequency.

When the rotor blade enters a wake it is exposed to a step-like shearing force. This has been confirmed by actual measurements on wind turbines. Still in order to keep a constant load on the rotor blades under this condition, said rotor-cyclic pitch control can be applied resulting in a basic optimization of the load. But as the affected load is of step-like behavior and the said rotor-cyclic pitch control is of sinusoidal behavior there will always occur a non negligible alternating load on the rotor blades.

Figure 6:
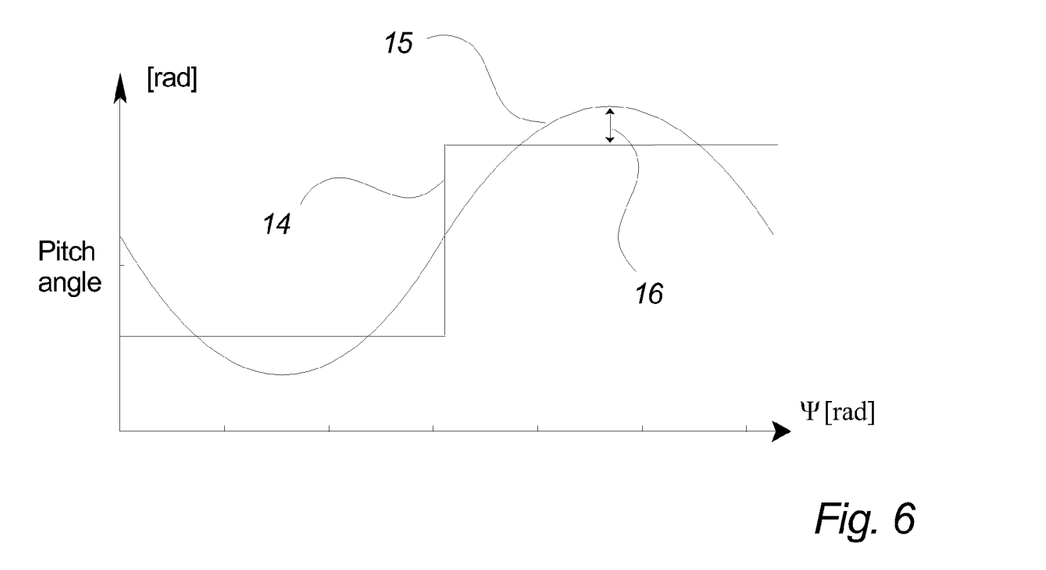
FIG. 6 illustrates the pitch angle error between a desired step function and a rotor-cyclic pitch angle regulation.

This is illustrated in FIG. 6 for said idealized half-wake situation. The curve 14 illustrates a desired abrupt change in pitch angle control and the curve 15 illustrates an actual corrective pitch angle control applied by the said rotor-cyclic pitch technique. Due to the difference between the two curves, an angle error 16 is introduced still resulting in a possibility of increased fatigue loads on the rotor blades.

An example of the present invention for controlling out of plane moment loads on wind turbine blades of a wind turbine is here described.

Figure 7:
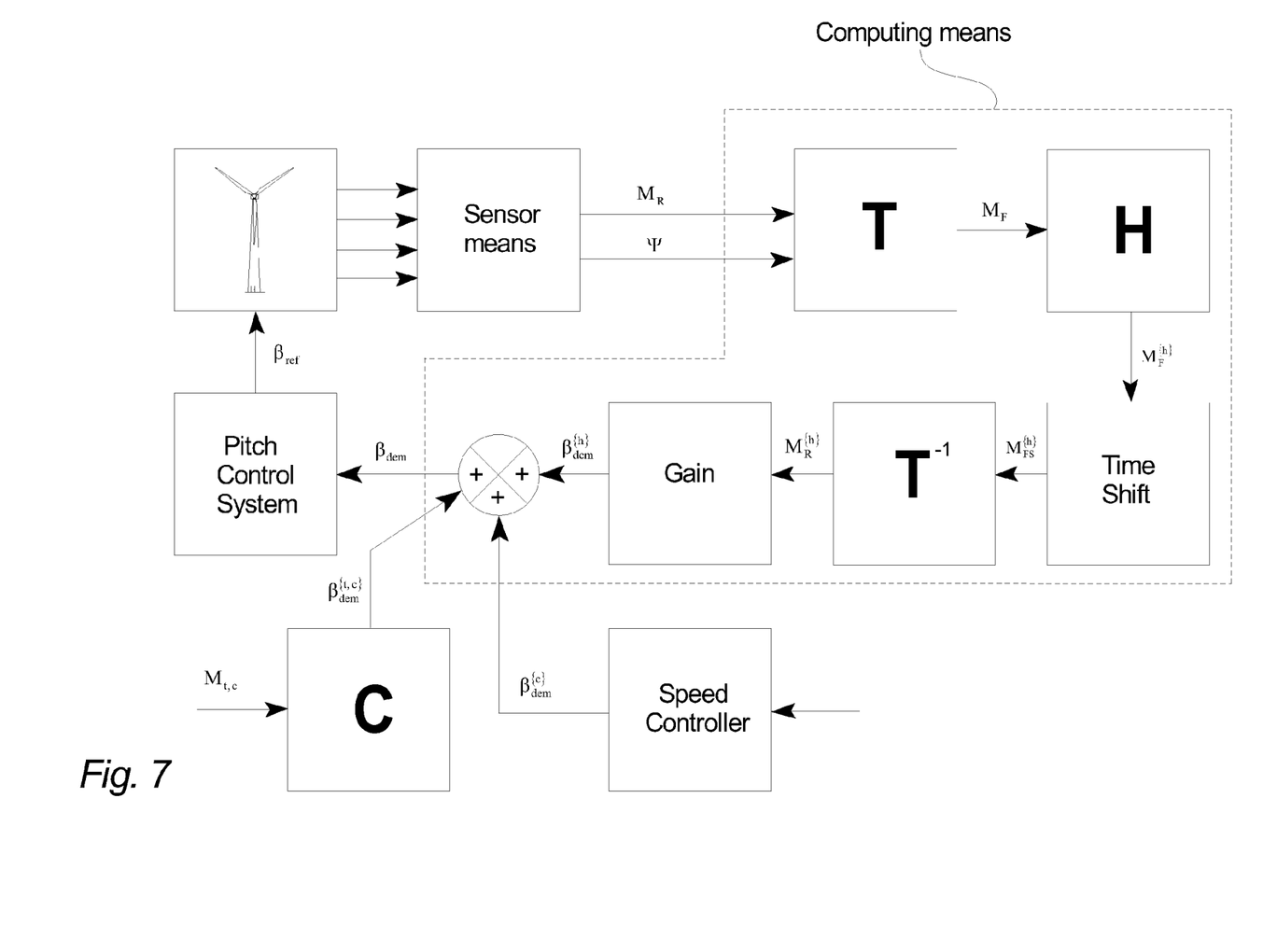
FIG. 7 illustrates schematically the functionality of the invented adaptive pitch system in a pitch controlled wind turbine.

FIG. 7 illustrates for the present invention a preferred embodiment of the said control system for controlling the pitch angles of the wind turbine blades.

The moment loads $M_R = [m_1 \ m_2 \ m_3]^T$ on the rotor blades and the azimuth angle $\psi$ is measured by the sensor means and feed to the computing means. $M_R$ is transformed into a coordinate system defined by the tilt, yaw and thrust equivalent direction $M_F = [m_{tilt} \ m_{yaw} \ m_{sum}]^T = T \, M_R$ Where:

$$T = \begin{bmatrix} \cos(\Psi) & \cos\left(\Psi + \frac{4}{3}\pi\right) & \cos\left(\Psi + \frac{2}{3}\pi\right) \\ -\sin(\Psi) & -\sin\left(\Psi + \frac{4}{3}\pi\right) & -\sin\left(\Psi + \frac{2}{3}\pi\right) \\ 1 & 1 & 1 \end{bmatrix}$$

The inverse relation is given by: $M_R = T^{-1} \cdot M_F$ $M_F$ is data processed by a filter (H) to $M_F^{\{h\}}$, deriving and processing a plurality of harmonic functions on different multiple integers of the rotor frequency ($\omega_{nom}$) in order to adapt the pitch angle control system to reduce the fluctuations on measured load data in such a way, that the variation of the loads on the rotor blades are reduced in order to reduce the fatigue loads on the blades.

Alternatively, only one harmonic function of the rotor frequency ($\omega_{nom}$) is derived by the data processing, resulting in a simpler control system, the aforementioned rotor-cyclic pitch control system, which could also be applied with the present invention.

A preferred embodiment of said data processing filter (H) is a Recursive Least Square (RLS) Estimator with exponential forgetting. This is a mathematical optimization technique that attempts to find a best fit to a set of data by attempting to minimize the sum of the squares of deviation between a set of observed data and a set of expected data.

The RLS processing algorithm is based on a few key-operators and can in a computer routine be implemented after the following algorithm:

---
Routine:

$\phi(t) = [1 \ \cos(\omega_{nom}t) \ \sin(\omega_{nom}t) \ \cos(2\omega_{nom}t) \ \sin(2\omega_{nom}t) \ \cos(3\omega_{nom}t)$
$\quad \sin(3\omega_{nom}t) \ \cos(4\omega_{nom}t) \ \sin(4\omega_{nom}t)]^T$
$\theta = [a_0 \ a_1 \ b_1 \ a_2 \ b_2 \ a_3 \ b_3 \ a_4 \ b_4]^T$
R = 9×9 matrix initialized with zero elements
G = 9×1 vector initialized with zero elements
$\mu = 1/k_0$
  for p = 1..N     (p is expressed as routine step number, 1, 2, 3..)
    $t = p \cdot T_S$
    for i=1..3     (iteration over $m_{tilt}$, $m_{yaw}$ and $m_{sum}$)
      $G^{(i)} = (1-\mu) \, G^{(i)} + \mu \, \phi(t) \, M_F^{(i)}$
      $R^{(i)} = (1-\mu) \, R^{(i)} + \mu \, \phi(t) \, \phi(t)^T$
      $\theta^{(i)} = (R^{(i)})^{-1} \, G^{(i)}$
      $M_F^{\{h\}(i)} = \phi(t)^T \theta^{(i)}$
    end
end

---

In the above computer simulation example:
$\omega_{nom}$ = the nominal cyclic rotor frequency
$\phi$ = the harmonic analysis vector (here including components up to the $4^{th}$ harmonic)
$\theta$ = the harmonic amplitudes
R = is a 9×9 matrix, initialized with zero elements
G = is a 9×1 vector, initialized with zero elements
$T_s$ = the simulation step time
$\mu$ = a forgetting factor
$k_0$ = a positive integer defining the forgetting factor It is worth noting that the said RLS filter is adaptive which yields that the output of the filter changes as a response to a change on the input.

A practical applied version of the data processing comprises computing means for digital data acquisition, harmonic analysis, RLS filter computation, data storage and D/A converting, continuously or for a predetermined period of time.

Due to time-delays in the sensor means, in the computer means and in the pitch control system, the corrective pitch angle control signal is time shifted in relation to the measured blade loads $M_R$. To correct for this, $M_F^{\{h\}}$ is time shifted equivalently to synchronize i.e. $M_{FS}^{\{h\}} = \text{timeshift}(M_F^{\{h\}})$.

A general time shift of a sum of harmonic signals can be realized as follows:

$$s(t) = \sum_{i=1}^{n} a_i \cos(\omega_i t) + b_i \sin(\omega_i t)$$

so $$s(t+\tau) = \sum_{i=1}^{n} P^{[i]T} C^{[i]}(t) Q^{[i]}(\tau),$$

$$(1 \times 2) \times (2 \times 2) \times (2 \times 1) = (1 \times 1)$$

where:

$$P^{[i]} = [a_i b_i]^T$$

$$C^{[i]}(t) = \begin{bmatrix} \cos(\omega_i t) & -\sin(\omega_i t) \\ \sin(\omega_i t) & \cos(\omega_i t) \end{bmatrix}$$

$$Q^{[i]}(\tau) = [\cos(\omega_i t) \ \sin(\omega_i t)]^T$$

The filtered and time shifted signal $M_{FS}^{\{h\}}$ is transformed from the fixed reference system back to the rotating reference system by $M_R^{\{h\}} = T^{-1} \cdot M_{FS}^{\{h\}}$.

The signal $M_R^{\{h\}}$ is multiplied with a gain for the conversion to radians i.e. $\beta_{dem}^{\{h\}} = \text{Gain} M_R^{\{h\}}$ and is added to the collective pitch demand signal $\beta_{dem}^{\{c\}}$.

Figure 8A:
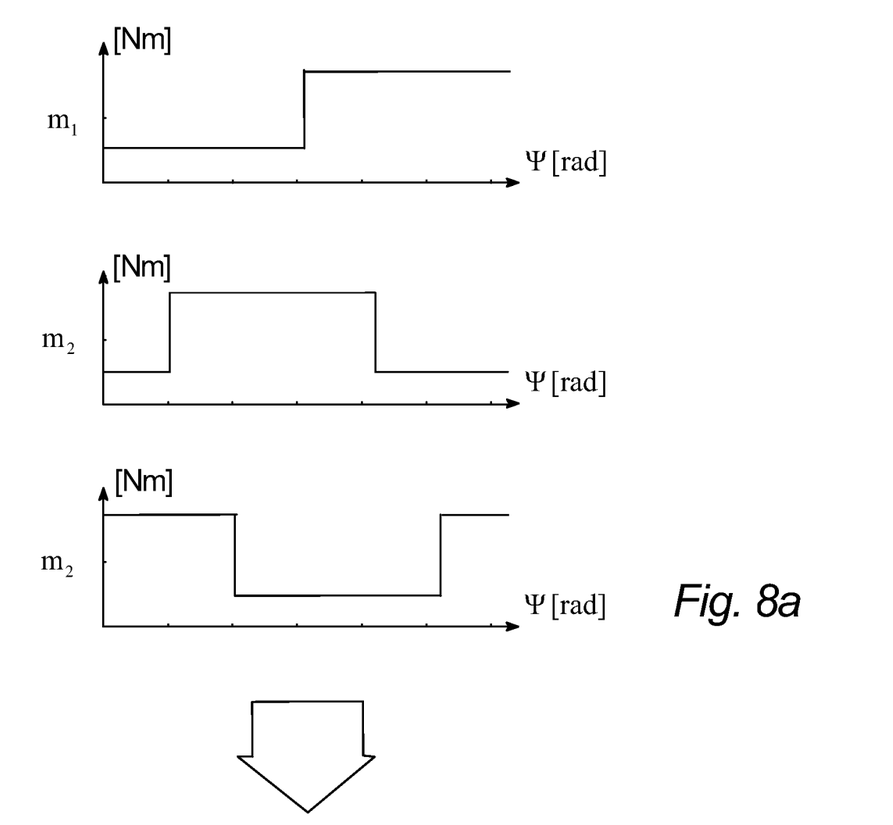
FIG. 8a illustrates the out of plane moment loads on the rotor blades of a 3 bladed wind turbine as a result of a horizontal step shear corresponding to an idealized half wake inflow situation.

FIG. 8a illustrates as an example moment loads $M_R = [m_1 \; m_2 \; m_3]^T$ on the rotor blades of a 3 bladed wind turbine as a result of a horizontal step shear corresponding to an idealized half wake inflow situation.

Transforming $M_R$ into a coordinate system defined by the tilt, yaw and thrust equivalent direction, the respective moments loads $m_{tilt}$, $m_{yaw}$, $m_{sum}$ become:

$$m_{tilt} = m_1 \cdot \cos(\Psi) + m_2 \cdot \cos\left(\Psi + \frac{4}{3}\pi\right) + m_3 \cdot \cos\left(\Psi + \frac{2}{3}\pi\right)$$

$$m_{yaw} = -m_1 \sin(\Psi) - m_2 \sin\left(\Psi + \frac{4}{3}\pi\right) - m_3 \cdot \sin\left(\Psi + \frac{2}{3}\pi\right)$$

$$m_{sum} = m_1 + m_2 + m_3$$

Figure 8B:
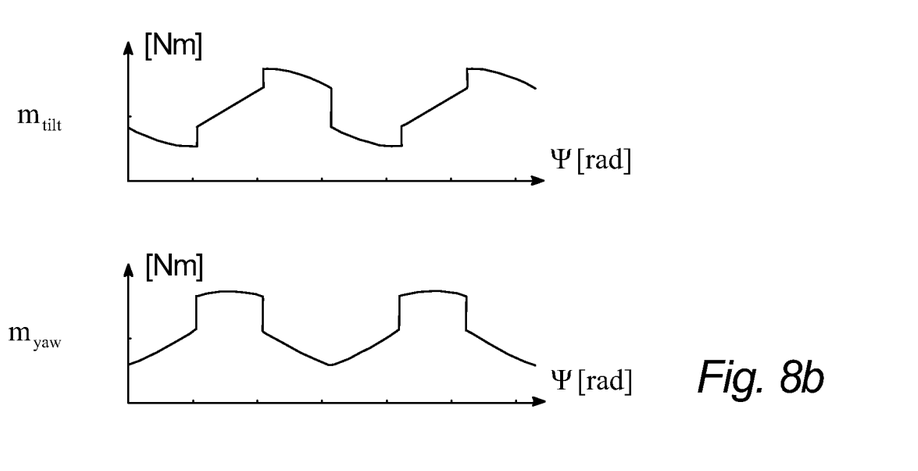
FIG. 8b illustrates the transformed moment loads, $m_{tilt}$, $m_{yaw}$, as a function of azimuth for one full rotor rotation and as a result of the said horizontal step shear.

$m_{tilt}$, $m_{yaw}$, are illustrated in FIG. 8b as a function of one full rotation of the rotor.

Periodic functions like the functions illustrated in FIG. 8b can be resolved as an infinite sum of sines and cosines called a Fourier series and can in this case generally be expressed as:

$$m(\Psi) = \frac{a_0}{2} + a_1 \cos(\Psi) + b_1 \sin(\Psi) + a_2 \cos(2\Psi) + b_2 \sin(2\Psi) + a_3 \cos(3\Psi) + b_3 \sin(3\Psi) \ldots$$

where:

$$a_i = \frac{1}{\pi} \int_0^{2\pi} m(\Psi) \cos(i\Psi) d\Psi$$

$$b_i = \frac{1}{\pi} \int_0^{2\pi} m(\Psi) \sin(i\Psi) d\Psi$$

for $i = 0, 1, 2, 3, \ldots$

The computation of Fourier series is known as Harmonic Analysis.

It is seen from the equation of $m(\Psi)$ that the Fourier series consists of a non-alternating component, components that alternate according to the basic parameter $\Psi$ and a plurality of periodic functions of different integer multiples of the basic frequency. The weighted Fourier coefficients $a_i$, $b_i$ determine the amplitude of each harmonic frequency in the original signal.

The said RLS estimator data processes a truncated number of periodic functions derived by the harmonic analysis e.g. the first four multiple harmonics of the basic rotor frequency. The purpose of the RLS estimator is to produce an output signal that is feed to the pitch control system in order to minimize the energy in the load signal $M_R$ i.e. to minimize the fluctuating loads on the rotor blades.

Figure 9:
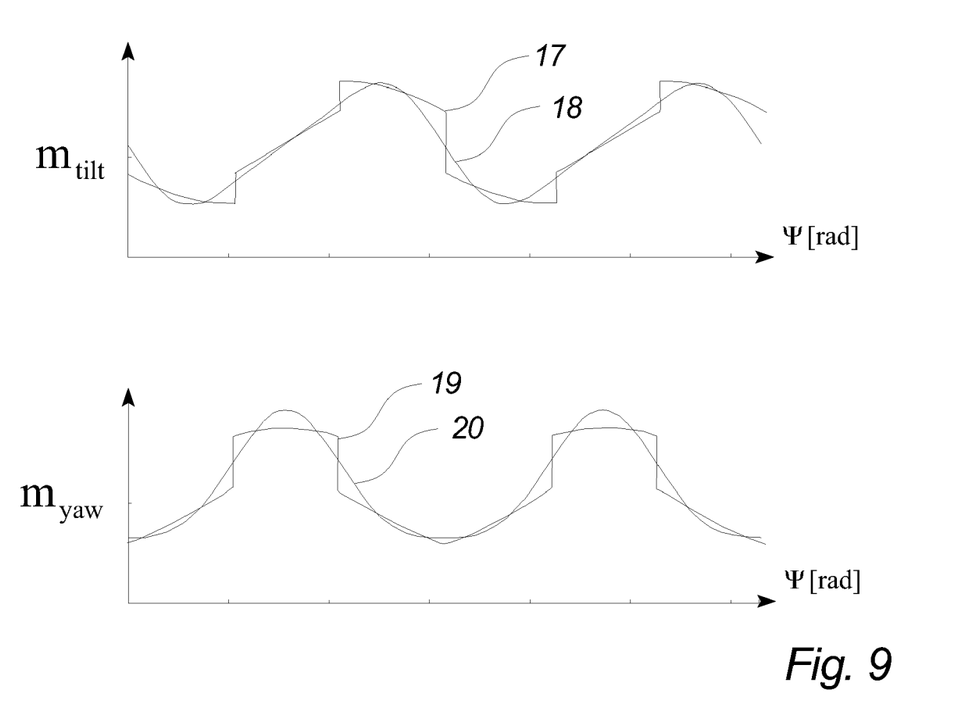
FIG. 9 illustrates the difference between actual transformed moment loads $m_{tilt}$, $m_{yaw}$ and filtered moment loads $m_{tilt}^{\{h\}}$ and $m_{yaw}^{\{h\}}$ as a result of a horizontal step shear corresponding to an idealized half wake inflow situation.

For this idealized example the input signals 17, 19 representing the loads moments $m_{tilt}$ and $m_{yaw}$ of $M_F$ respectively are illustrated in FIG. 9. The output signals $M_{tilt}^{\{h\}}$ and $m_{yaw}^{\{h\}}$ of $M_F^{\{h\}}$ are represented by 18, 20 respectively. The said RLS filter has processed the first four multiple harmonics of the basic frequency.

The filtered signal $M_F^{\{h\}}$ is time shifted to a signal $M_{FS}^{\{h\}}$ and transformed from the fixed reference system back to the rotating reference system by $M_R^{\{h\}} = T^{-1} \cdot M_{FS}^{\{h\}}$ where:

$$T = \begin{bmatrix} \cos(\Psi) & \cos\left(\Psi + \frac{4}{3}\pi\right) & \cos\left(\Psi + \frac{2}{3}\pi\right) \\ -\sin(\Psi) & -\sin\left(\Psi + \frac{4}{3}\pi\right) & -\sin\left(\Psi + \frac{2}{3}\pi\right) \\ 1 & 1 & 1 \end{bmatrix}$$

Finally the filtered signal $M_R^{\{h\}}$ is gain adjusted to obtain a pitch angle control signal $\beta_{dem}^{\{h\}}$.

In order to produce the predetermined counteracting mean tilt moment $M_{t,c}$ of a size corresponding to the part of the bending moment caused by the overhang load forces as measured when the rotor is idling or at stand still during low wind speed that is intended to be counteracted by the aerodynamic forces on the rotor, e.g. 20-50% thereof, but theoretically up to 100% of the bending moment a separate control circuit is provided. The predetermined counteracting mean tilt moment $M_{t,c}$ is provided to a control unit C, where it is transformed from the fixed reference system to the rotating reference system by the $T^{-1}$ function and the control unit determines the pitch angle control signal $\beta_{dem}^{\{t,c\}}$ that contains the pitch angle change for each azimuth angle for the rotor blades for producing the counteracting mean tilt moment $M_{t,c}$, i.e. to generally increase the horizontal aerodynamic load on the blade when it is in the upper half of the rotor plane and decrease the horizontal aerodynamic load on the blade when it is in the lower half of the rotor plane.

These two pitch angle control signal $\beta_{dem}^{\{t,c\}}$ and $\beta_{dem}^{\{h\}}$ are added to an overall pitch angle control signal $\beta_{dem}^{\{c\}}$ defined by a wind turbine speed controller and the summarized control signal $\beta_{dem}$ is feed to the pitch controller that effectuates the desired actions.

In an alternative embodiment, the predetermined counteracting mean tilt moment $M_{t,c}$ is fed into the Computing Means as a reference value defining a tilt moment offset to be obtained by the control of the pitch system, where the original Computing Means operates with a tilt moment reference value of zero. Thus, the predetermined counteracting mean tilt moment $M_{t,c}$ may e.g. be fed to the gain module where it is transformed from the fixed reference system to the rotating reference system by the $T^{-1}$ function and the pitch angle control signal $\beta_{dem}^{\{h\}}$ is determined to minimise the deviations between the actual load function of the blades and the desired load function, which provides the predetermined counteracting mean tilt moment $M_{t,c}$ of the rotor as well as zero yaw moment, resulting in a decrease of the fatigue loads on the blades as well as a decreased mean tilt moment on the main bearings, resulting in a prolongation of the life time of the main bearings.

The invention has been exemplified above with reference to specific examples of a wind turbine with a control system for controlling the wind turbine blades by pitch mechanisms. However, it should be understood that the invention is not limited to the particular examples described above but may be designed and altered in a multitude of varieties within the scope of the invention as specified in the claims e.g. in using other formulas and/or measuring data as a supplement.

What is claimed is:

1. A wind turbine, comprising:
    a rotor having a hub and at least two blades,
    a main bearing providing a rotational support of the rotor on a non-rotating part of the wind turbine,
    a blade pitching mechanism for individual adjustment of an angle of each of the blades about their longitudinal axes, and a control system for controlling operation of the blade pitching mechanism during ordinary operation of the wind turbine in order to reduce a bending moment on the main bearing caused by overhang load forces from a gravitational pull on the rotor mass.

2. The wind turbine according to claim 1, wherein the control system controls the blade pitching mechanism in response to a predetermined value of a counteracting aerodynamic mean tilt moment so that the aerodynamic mean tilt moment on the rotor counteracts the bending moment on the main bearing caused by overhang load forces from the gravitational pull on the rotor mass.

3. The wind turbine according to claim 2, wherein the mean tilt moment on the rotor counteracts at least 20% of the bending moment on the main bearing caused by the overhang load forces from the gravitational pull on the rotor mass.

4. The wind turbine according to claim 1, wherein ordinary operation of the wind turbine includes operation of the wind turbine at average wind speeds between 12 m/s and 18 m/s.

5. The wind turbine according to claim 1, further comprising measurement means arranged to detect load data of the rotor, the load data being a measure of an instantaneous mechanical load on the rotor, and to provide an output accordingly of said load data to the control system,
wherein the control system is further arranged to operate the blade pitching mechanism to perform adjustment of the angle of each of the blades in response to the load data output from the measurement means.

6. The wind turbine according to claim 5, wherein the control system determines a common cyclic pitch function and operates the blade pitching mechanism according to the cyclic pitch function depending on an instantaneous azimuth angle of an individual blade.

7. The wind turbine according to claim 5, wherein said measurement means is arranged to provide a measure of blade root bending moments.

8. The wind turbine according to claim 5, wherein said measurement means is arranged to provide a measure of an angle of attack for the blades.

9. The wind turbine according to claim 5, wherein the control system comprises data collection and storage devices for repeatedly collecting and storing the load data of the rotor, and a data processor for processing the collected load data of the rotor of the wind turbine and determining a load distribution function for the rotor from the load data, wherein the control system is arranged to operate the blade pitching mechanism in response to the determined load distribution function.

10. A method of reducing a mean bending moment on a main bearing of a wind turbine, a rotor being rotationally supported by the main bearing, the method comprising:

operating a blade pitching mechanism of the wind turbine to individually pitch the rotor blades of the wind turbine in response to a predetermined value of a counteracting aerodynamic mean tilt moment, so that the aerodynamic mean tilt moment on the rotor counteracts the bending moment on the main bearing caused by overhang load forces from gravitational pull on the rotor mass substantially corresponding with the predetermined value.

11. The method according to claim 10, wherein the predetermined mean tilt moment on the rotor corresponds to a counteracting of at least 20% of the bending moment on the main bearing caused by the overhang load forces from the gravitational pull on the rotor mass.

12. The method according to claim 10, wherein ordinary operation of the wind turbine includes operation of the wind turbine at average wind speeds between 12 m/s and 18 m/s.

13. The method according to claim 10, further comprising:
repeatedly collecting and storing load data of the rotor,
determining a load distribution function for the rotor from the stored data, and
operating a blade pitching mechanism of the wind turbine to individually pitch the rotor blades of the wind turbine in response to the determined load distribution function.

14. The method according to claim 13, wherein the load data of the rotor is obtained by means of measurement means arranged to provide a measure of blade root bending moments.

15. The method according to claim 13, wherein the load data of the rotor is obtained by means of measurement means arranged to provide a measure of an angle of attack for the blades.

16. The method according to claim 13, wherein the load distribution function for the rotor comprises a measure of a tilt moment function of the rotor.

17. A wind turbine, comprising:
a rotor having a hub and at least two blades,
a main bearing providing a rotational support of the rotor on a non-rotating part of the wind turbine,
a blade pitching mechanism for individual adjustment of an angle of each of the blades about their longitudinal axes, and
a control system for controlling operation of the blade pitching mechanism during ordinary operation of the wind turbine to perform adjustment of the angle of each of the blades in response to a predetermined value of a counteracting aerodynamic mean tilt moment so that the aerodynamic mean tilt moment on the rotor counteracts a bending moment on the main bearing caused by overhang load forces from a gravitational pull on the rotor mass.

* * * * *